United States Patent [19]

Schneider et al.

[11] Patent Number: 4,591,276
[45] Date of Patent: May 27, 1986

[54] RADIAL BALL-AND-SOCKET BEARING

[75] Inventors: Karl-Heinz Schneider, Schwalbach-Elm; Otto Paeschke, Puettlingen; Michael Del Fabro, Puettlingen; Norbert Loeser, Puettlingen, all of Fed. Rep. of Germany

[73] Assignee: SKF GmbH, Schweinfurt, Fed. Rep. of Germany

[21] Appl. No.: 689,884

[22] Filed: Jan. 9, 1985

[30] Foreign Application Priority Data

Jan. 14, 1984 [DE] Fed. Rep. of Germany ... 8400958[U]

[51] Int. Cl.$^4$ .................. F16C 23/00; F16C 11/06
[52] U.S. Cl. ................................ 384/206; 384/203
[58] Field of Search ............. 384/192, 202–212, 384/428, 438, 439, 495–498, 558

[56] References Cited

U.S. PATENT DOCUMENTS

| | | | |
|---|---|---|---|
| 3,115,375 | 12/1963 | Haller | 384/206 |
| 3,226,141 | 12/1965 | Sullivan, Jr. | 384/203 X |
| 3,367,728 | 2/1968 | Labbie | 384/208 |
| 3,909,084 | 9/1975 | Snidar et al. | 384/203 |

FOREIGN PATENT DOCUMENTS

| | | | |
|---|---|---|---|
| 2201874 | 7/1973 | Fed. Rep. of Germany | 384/206 |
| 1161244 | 8/1969 | United Kingdom | 384/206 |
| 1585337 | 2/1981 | United Kingdom | 384/428 |

Primary Examiner—Stuart S. Levy
Assistant Examiner—Thomas R. Hannon
Attorney, Agent, or Firm—Yuter, Rosen & Dainow

[57] ABSTRACT

A radial ball-and-socket bearing having an elastic outer ring for receiving a ball-shaped element. An annular, axially directed recess is formed in the front surface of the outer ring, and a plurality of axially directed slots extend radially therethrough from the front face. The slots and recess define sets of inner and outer tongues which flex to enable insertion of the ball-shaped element in the bore of the outer ring. At least one of the confronting surfaces of the radially adjacent inner and outer tongues is provided with one or more ribs, which are separated from the facing tongue surface by a gap when the bearing is unassembled and which are nearly or completely closed when the bearing is assembled. The circumferential surface of the outer ring has radial projections in the area of the recess for snapping the outer ring into the bore of a housing. The outer ring is further provided with at least one resilient element arranged on the unslotted end of the outer ring and capable of flexure in the axial direction, whereby the outer ring is snapped into the housing bore with axial prestress.

10 Claims, 7 Drawing Figures

RADIAL BALL-AND-SOCKET BEARING

FIELD OF THE INVENTION

The invention relates to a radial ball-and-socket bearing comprising an outer ring or the like and an inner ring or the ball end, the latter being arranged in a spherical bore in the outer ring, and wherein the outer ring is provided with an annular axially directed recess facing on one end and with projections on a circumferential surface in the area of the recess.

BACKGROUND OF THE INVENTION

A ball-and-socket bearing of the above-described type is disclosed, for example, in DE-AS No. 2525836. In this known construction of a ball-and-socket bearing, elastic cross-pieces are provided in the annular, axially directed recess of the outer ring, the cross-pieces being deformed during insertion of the bearing in a housing bore as part of the outer ring is compressed radially inwardly. In this way, abutment with prestress of the bore surface of the outer ring on the surface of the ball pin is achieved. Because of the tolerances dictated by the manufacturing process, it is not possible in this known construction to attain a predetermined play, or a predetermined prestress, between the bearing parts.

Furthermore, a play-free ball-and-socket bearing is disclosed in DE-GM No. 1936279, according to which an eccentrically arranged annular groove is provided in the bore of the outer ring, so that on one side of the outer ring a thin-walled, annular, elastic web is formed which is deformed during insertion of the inner ring in the bore of the outer ring and renders the bearing free of play.

According to these known constructions, the inner ring or ball end can be forced out of the bore of the outer ring under the influence of high axial loads.

SUMMARY OF THE INVENTION

The object of the present invention is to produce an economically fabricated ball-and-socket bearing whereby a predetermined play, or a predetermined prestress, between the parts of the bearing will be achieved and the inner ring or ball end will not be forced out of the bore of the outer ring or the like after the bearing is assembled.

This object is achieved in the ball-and-socket bearing of the present invention, by providing the outer ring with axially directed, radially throughgoing slots on the end having the annular recess. This recess separates the outer and inner elastic tongues. At least one of the confronting surfaces of the radially adjacent tongues is provided with one or more ribs or the like, whereby in the unassembled state of the bearing the ribs are separated from the opposing tongue by a gap, whereas in the assembled state of the bearing the ribs and opposing tongue are nearly or completely closed, i.e. in contact.

In accordance with a further feature of the present invention, the confronting surfaces of two or more diametrally opposed outer tongues are not provided with ribs or the like. Furthermore, on the unslotted end of the outer ring, at a distance from the front surface and facing outwardly on the circumferential surface, a circumferential recess is provided which separates a cup spring-like portion. This cup spring-like portion serves the dual purpose of compensating for axial tolerances and producing an axially directed prestress in the housing.

BRIEF DESCRIPTION OF THE DRAWINGS

The preferred embodiments of the present invention will be described in detail with reference to the following drawings, wherein.

DETAILED DESCRIPTION OF THE PREFERRED EMBODIMENT

Figure 1:
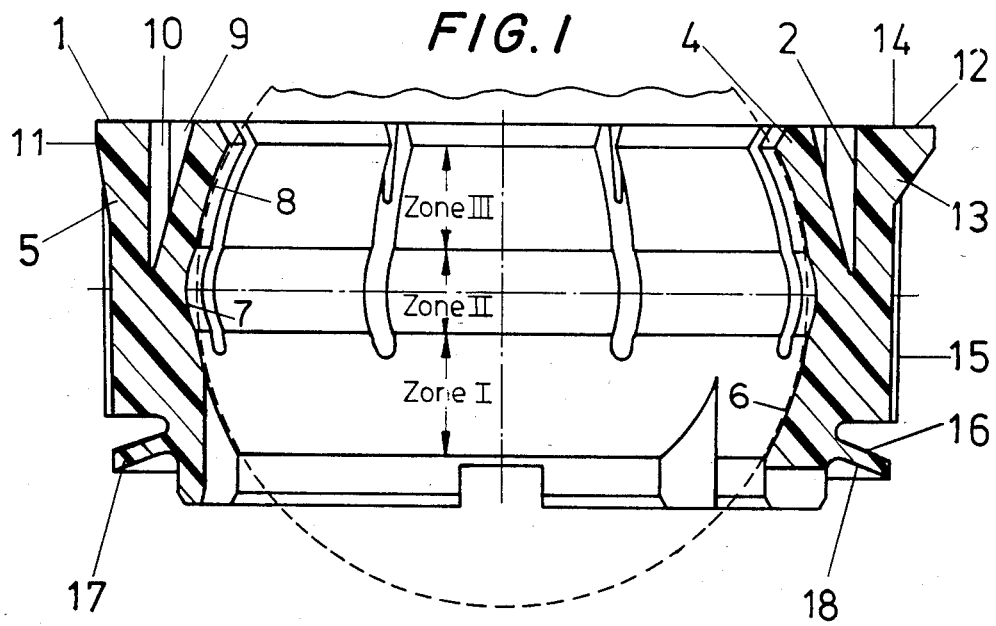
FIG. 1 is an axial section, taken along section A-B shown in FIG. 2, of the outer ring for a ball-and-socket bearing according to the present invention.
Figure 2:
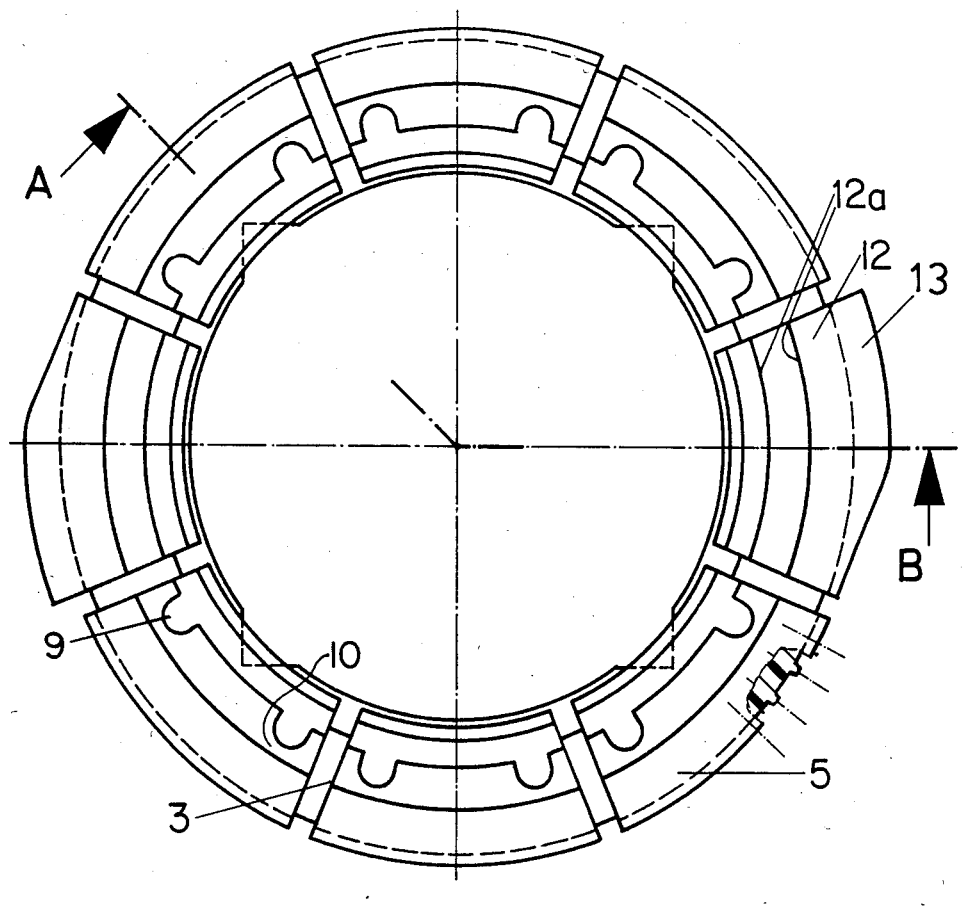
FIG. 2 is a plan view of the outer ring depicted in FIG. 1.

The outer ring for a ball-and-socket bearing shown in FIGS. 1 and 2, beginning at the transverse face at the end in which a rotatable element is inserted, i.e., at the front face 1, is provided with an annular recess 2 and a plurality of circumferentially distributed slots 3 extending radially therethrough. The recess 2 extends axially with respect to the bearing axis and separates radially inner tongues 4 from radially outer tongues 5. Three zones are provided in the bore of the outer ring. Zone I at the end opposite face 1 comprises a portion 6 forming the sliding surface for the rotatable element, i.e., an inner ring or ball end (shown in part in dashed lines in FIG. 1), of the ball-and-socket bearing. Central zone II comprises a portion 7 having a circular recess such that the inner ring (or ball end) in this area has no contact with the outer ring. In Zone III, toward the face 1, the inner tongues 4 are provided with surfaces 8 having radii of curvature such that the distance between all points on the surfaces 8 and the bearing center (i.e., the geometrical center of the inner ring or ball when positioned inside the outer ring) is smaller than the radius of curvature of the sliding surface of the inner ring (or ball end) when the bearing is unassembled, so that resilient axially and radially acting forces arise which urge the inner ring (or ball end), into contact with portion 6 and produce freedom from play. Due to the resultant prestressing, the setting of a predetermined frictional moment and the automatic adjustability of the bearing are ensured. On the radially outer surfaces of some of the inner tongues 4, one or more axially directed ribs 9 are arranged, whereby in the unassembled state of the bearing a gap 10 separates the ribs 9 and the outer tongues 5. The outer tongues 5 each have a radially outer conical surface 11. In this way, the assembly of the outer ring in the bore of a housing (not shown) results in the radially inward flexure of the outer tongues 5 and the outer ring is arranged with radial prestress in the housing. This prestress acts on the inner ring not at all or only slightly. By means of these forces, the gap 10 between the axially directed ribs and the outer tongues 5 is substantially closed, i.e., the ribs and outer tongues are in contact, such that after insertion of the outer ring in the bore of a housing a form-locking is achieved between the inner tongues 4 and the outer tongues 5 whereby the decoupling of the inner ring (or ball end) after assembly of the bearing is prevented. Two diametrically opposed outer tongues 12 are each provided with a radially outwardly directed projection 13 having a radially directed end face 14. In order that the two outer tongues 12 can better yield in the radial direction, the mutually confronting surfaces 12a of the respective inner and outer tongues are formed without ribs 9. Adjacent the unslotted end of the outer ring (opposite to face 1), at a distance from the front face and opening outwardly on the circumferential surface 15, a circumferential recess 16 is provided, which separates a cup spring-like portion 17 from surface 15. The cup spring-like portion 17 has an outer side surface 18 which is inclined with respect to the plane transverse to the axis of the bearing. Upon insertion of the bearing in the housing bore sufficiently far in the axial direction, the cup spring-like portion 17 is biased until the radial projections 13 snap into a groove (not shown) or the like in the housing, whereby the outer ring is locked in the housing with constant axial prestress.

Figure 3:
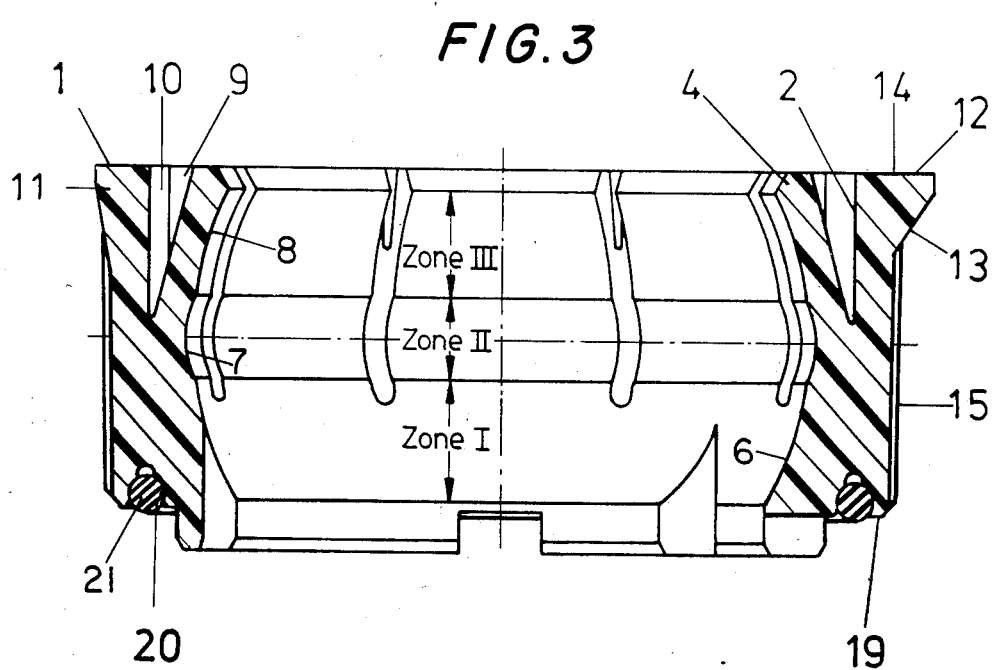
FIG. 3 is an axial section, taken along section C-D shown in FIG. 4, of a further embodiment of the outer ring.
Figure 4:
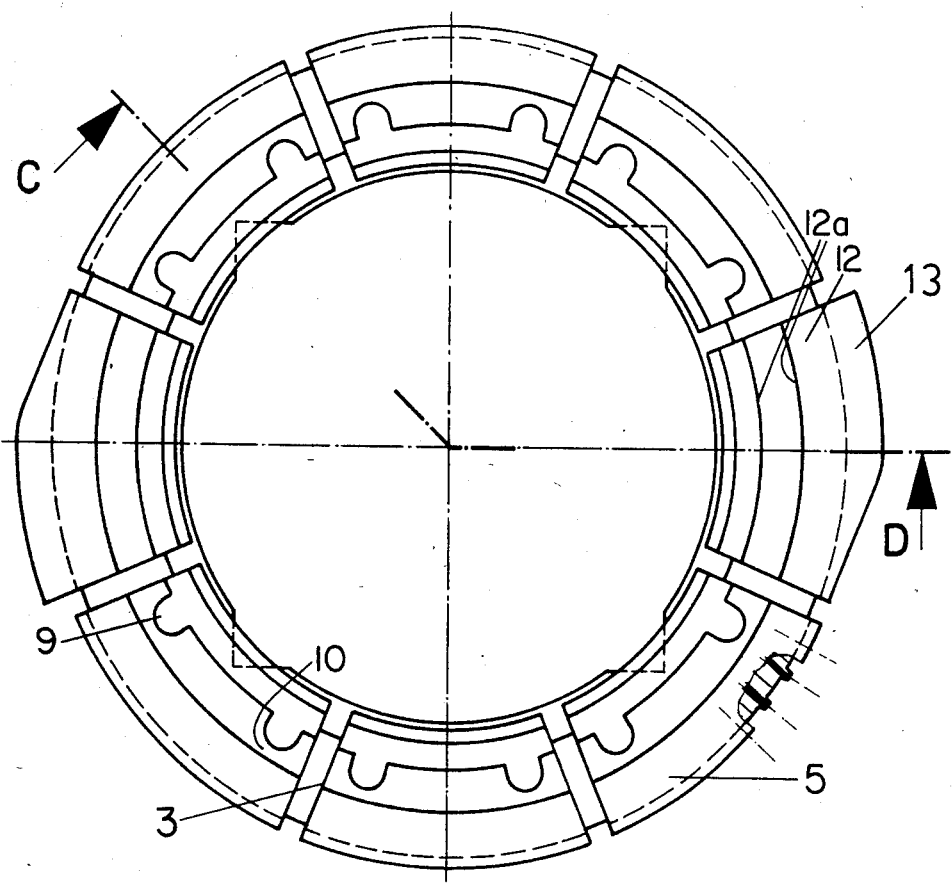
FIG. 4 is a plan view of the outer ring depicted in FIG. 3.

The outer ring for a ball-and-socket bearing depicted in FIGS. 3 and 4 differs from the outer ring shown in FIGS. 1 and 2 in that the surface facing away from the slots 3 has an annular recess 20, in which an O-ring 21 made of elastic material is arranged. This O-ring juts out above the surface 19 when the bearing is in the unassembled condition. Upon insertion of the bearing in the housing bore sufficiently far in the axial direction, the O-ring 21 is compressed until the radial projections 13 snap into a groove (not shown) or the like in the housing, whereby the outer ring is locked in the housing with constant axial prestress.

Figure 5:
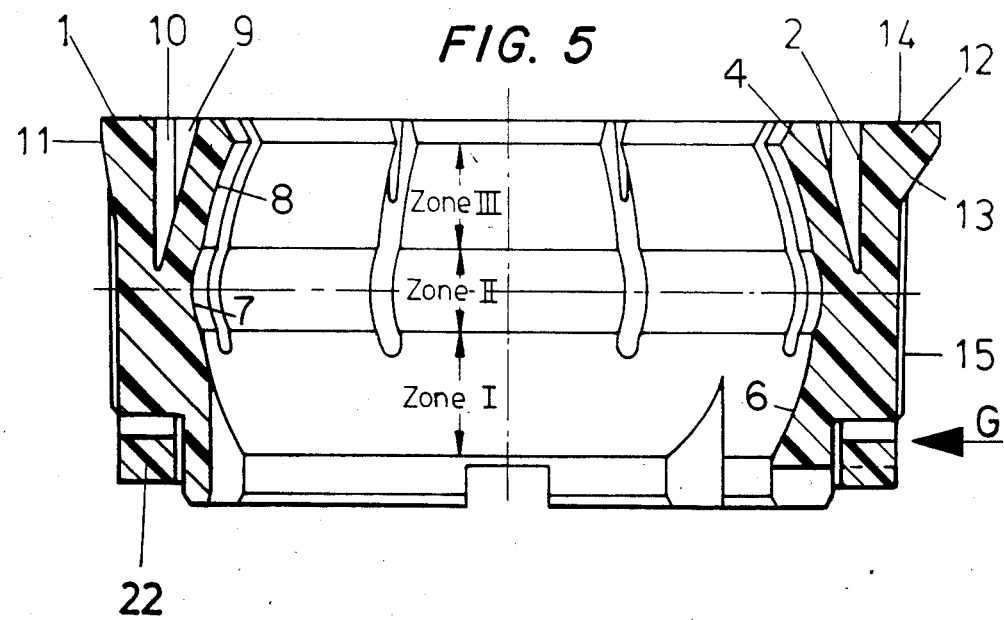
FIG. 5 is an axial section, taken along section E-F shown in FIG. 6, of another preferred embodiment of the outer ring according to the present invention.
Figure 6:
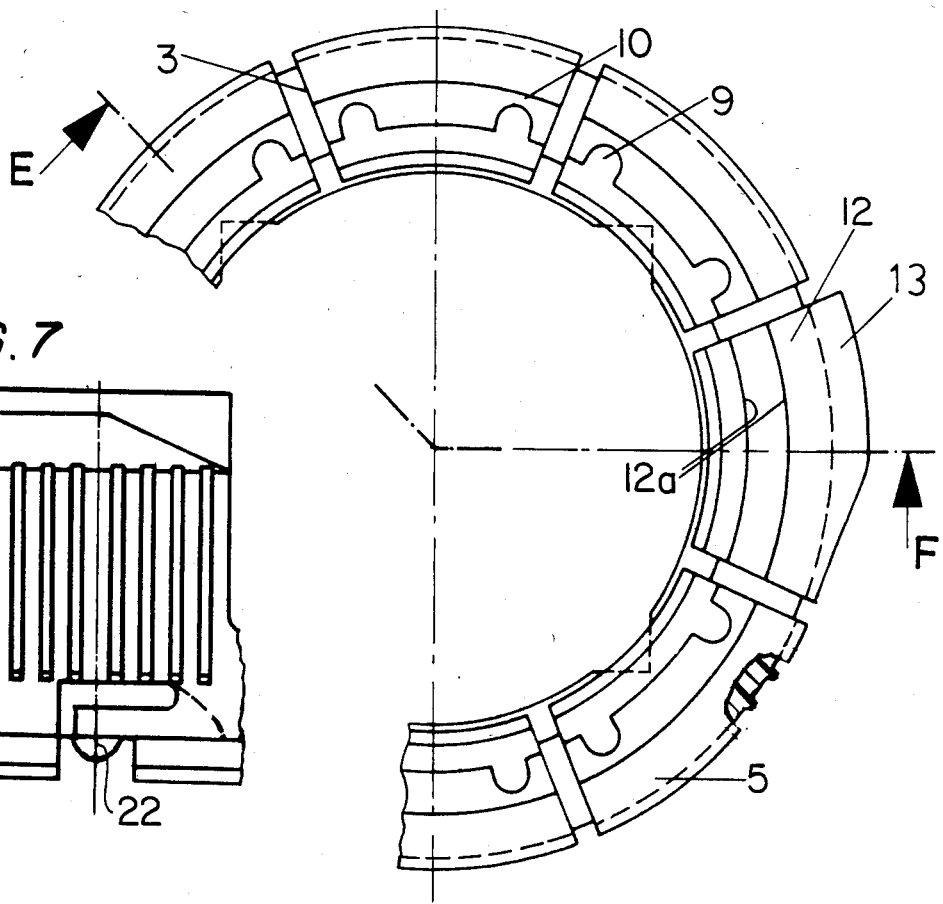
FIG. 6 is a partial plan view of the outer ring shown in FIG. 5.
Figure 7:
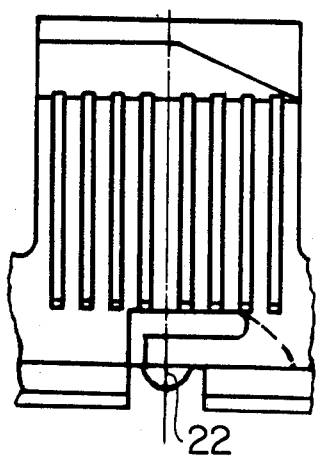
FIG. 7 is a partial view of the outer ring shown in FIG. 5, taken along arrow G.

In accordance with the embodiment shown in FIGS. 5-7, instead of the cup spring-like portion 17 (FIG. 1), the outer ring of the ball-and-socket bearing is provided with a plurality of resilient tongues 22 arranged to flexibly deflect in the axial direction in response to engagement with a bore surface in the bearing housing.

The foregoing description of the preferred embodiment is presented for illustrative purposes only and is not intended to limit the scope of the invention as defined in the appended claims. Modifications may be readily effected by one having ordinary skill in the art without departing from the spirit and scope of the inventive concept herein disclosed.

What is claimed is:

1. In a ball-and-socket bearing comprising an outer ring having a bore for receiving a ball-shaped element, an axis, a front surface defining an end for receiving said ball-shaped element, and a recess extending axially from said front surface, the improvement wherein said outer ring further comprises a plurality of axially directed slots extending radially therethrough at said end, said slots and said recess forming adjacent radially inner and radially outer tongues, each of said inner tongues having a surface which radially faces a corresponding surface on the respective radially adjacent outer tongue, at least one of said confronting tongue surfaces being provided with one or more ribs, whereby said ribs are separated from the confronting tongue surface by a gap when said bearing is unassembled and said ribs engage said confronting tongue surface when said bearing is assembled.

2. The ball-and-socket bearing as defined in claim 1, wherein said bore comprises an annular recess sectioned by said slots, a sliding surface for slidingly contacting said ball-shaped element and positioned adjacent said annular recess toward the end of said outer ring opposite said first mentioned end, said sliding surface having a center of curvature, and an engaging surface sectioned by said slots and arranged adjacent to said annular recess toward said first mentioned end of said outer ring, said engaging surface being separated from said bearing center of curvature when said bearing is unassembled by a distance less than the radius of curvature of said sliding surface.

3. The ball-and-socket bearing as defined in claim 2, wherein said inner tongues have radially inwardly facing surfaces defining said engaging surface.

4. The ball-and-socket bearing as defined in claim 1, wherein said outer ring is made of elastic material.

5. The ball-and-socket bearing as defined in claim 1, wherein on at least one pair of diametrically opposed sets of inner and outer tongues, the confronting tongue surfaces are not provided with ribs.

6. The ball-and-socket bearing as defined in claim 1, wherein an annular recess is provided on the end of said outer ring opposite said first mentioned end, at a distance from said front surface and opening on the outer circumferential surface of said outer ring, said annular recess separating said circumferential surface from a cup spring-like portion.

7. The ball-and-socket bearing as defined in claim 6, wherein said cup spring-like portion has an outer side surface inclined with respect to a plane transverse to said bearing axis.

8. The ball-and-socket bearing as defined in claim 1, wherein said outer ring has an annular recess formed in a substantially transverse surface arranged at the end of said outer ring opposite said first mentioned end, in which an O-ring made of elastic material is inserted, said O-ring jutting out above said substantially transverse surface when said bearing is unassembled.

9. The ball-and-socket bearing as defined in claim 1, wherein said outer ring comprises at least two elastic projections arranged on a surface at the unslotted end of said outer ring, said elastic projections being capable of flexure in the axial direction in response to engagement with a bore surface in a bearing housing.

10. In a ball-and-socket bearing comprising an outer ring having a bore for receiving a ball-shaped element, said outer ring having an axis, a front surface defining an end for receiving said ball-shaped element, an axially directed recess extending from said front surface, the improvement wherein said outer ring further comprises a plurality of axially directed slots extending radially therethrough, said slots and said recess forming adjacent radially inner and radially outer tongues, each of said inner tongues having a surface which radially faces a corresponding surface on the respective radially adjacent outer tongue, at least one of said confronting tongue surfaces being provided with one or more ribs, whereby said ribs are separated from the confronting tongue surface by a gap when said bearing is unassembled and said ribs are only slightly separated from said confronting tongue surface when said bearing is assembled.

* * * * *